United States Patent [19]

Payne

[11] 4,215,031

[45] Jul. 29, 1980

[54] THICKENING ADDITIVES FOR UNSATURATED POLYESTER RESINS

[75] Inventor: Charles C. Payne, Chicago, Ill.

[73] Assignee: Nalco Chemical Company, Oak Brook, Ill.

[21] Appl. No.: 11,838

[22] Filed: Feb. 14, 1979

[51] Int. Cl.² ................................................ C08K 9/04
[52] U.S. Cl. ................................ 260/40 R; 252/316; 428/331
[58] Field of Search ...................... 260/40 R; 428/331

[56] References Cited

U.S. PATENT DOCUMENTS

| 2,597,872 | 5/1952 | Iler | 260/29.6 |
|---|---|---|---|
| 2,692,863 | 10/1954 | Iler | 260/37 R X |
| 2,740,765 | 4/1956 | Parker | 260/40 R X |
| 2,760,941 | 8/1956 | Iler | 260/40 R X |
| 2,974,105 | 3/1961 | Iler | 260/40 R X |
| 3,635,878 | 1/1972 | Gebura | 260/40 R |
| 3,916,058 | 10/1975 | Vossos | 428/331 X |
| 3,932,348 | 1/1976 | Camelon et al. | 260/40 R X |
| 3,974,125 | 8/1976 | Oswald et al. | 260/40 R |
| 4,081,496 | 3/1978 | Finlayson | 260/40 R X |
| 4,110,278 | 8/1978 | Demmler et al. | 260/40 R X |

*Primary Examiner*—Sandra M. Person
*Attorney, Agent, or Firm*—John G. Premo; Robert A. Miller

[57] ABSTRACT

An unsaturated polyester resin which contains at least 0.3% by weight of silica particles having an ultimate particle size within the range of 4–70 millimicrons, whose particles have their surface coated with a quaternary ammonium salt which contains at least 1 organic radical of at least 6 carbon atoms in chain length.

5 Claims, No Drawings

THICKENING ADDITIVES FOR UNSATURATED POLYESTER RESINS

INTRODUCTION

Unsaturated polyester resins are described in the *Modern Plastics Encyclopedia,* October 1977, Volume 54, Number 10A, McGraw-Hill, page 64, as follows:

"The essential ingredients of commercial unsaturated polyester resins are a linear polyester resin, a crosslinking monomer, and inhibitors to retard crosslinking until the resin is to be used by the fabricator.

"The linear polyester typically is the condensation product of an unsaturated dibasic acid as the source of α, β ethylenic unsaturation and a glycol. Usually a saturated dibasic acid is employed with the unsaturated acid to modify the degree of unsaturation and thereby the reactivity of the resulting resin. The unsaturated intermediates are commonly maleic anhydride and fumaric acid; the saturated acids are phthalic anhydride, isophthalic acid, and adipic acid; and the glycols are propylene glycol, ethylene glycol, diethylene glycol, and dipropylene glycol.

"The usual crosslinking monomers are styrene, vinyl toluene, methyl methacrylate, α-methyl styrene, and diallyl phthalate. Conventional inhibitors are hydroquinone, quinone, and t-butyl catechol.

"These basic resins can be polymerized into infusible materials by the action of free radicals. The usual source is a peroxide catalyst. Free radicals are formed by thermal decomposition of the catalyst, as in press molding applications, or by chemical decomposition in ambient temperature applications. Metallic soaps and/or tertiary amines are added to polyesters to act as catalyst activators at room temperature, the combinations of methyl ethyl ketone peroxide and cobalt octoate, and benzoyl peroxide and diethyl aniline, being commonly employed.

"Resin manufacturers add metallic soaps and tertiary amines to resins for performance at ambient temperatures, and may incorporate thixotropic agents such as pyrogenic silica. These agents permit the fabricator to apply the resin to vertical mold surfaces without risk of drainage prior to gelation. For open-mold applications or coatings, paraffin wax may be added to minimize inhibition of the cure of surfaces exposed to air. Ultraviolet absorbers such as benzophenones and benzotriazoles protect the cured polyesters from discoloration caused by sunlight."

The pyrogenic silica thixotropic agents described above, while allowing the resins to be sufficiently viscous so that they do not run from vertical surfaces, are extremely difficult to incorporate into the resin syrups. In many instances, the fine hydrophillic silica powders must be carefully blended over periods of time ranging as long as 6–8 hours in order to uniformly disperse these powders throughout the unsaturated resin syrups. This excessive mixing time represents a distinct disadvantage in the art of formulating unsaturated polyester resins.

While the present invention is directed to all unsaturated polyester resins, it is most uniquely adapted to treat those polyester resins which contain, prior to curing, styrene as a cross-linking agent. In the case of the fumaric-containing syrups, styrene is most often present in a molar ratio of styrene to fumaric acid of about 2:1. The styrene is, of course, used as a cross-linking agent. For a more detailed discussion of unsaturated polyester resins and, particularly, of those formulated with styrene, there is incorporated herein the section of the *Encyclopedia of Polymer Science and Technology,* Volume 11, Interscience, Division of John Wiley & Sons, 1963, pages 129–168 inclusive.

The styrene in these unsaturated resin syrups, while primarily present as a cross-linking agent, also acts as a solvent for the polyester. While I describe my invention with respect to the polyester resin in terms of styrene, it is understood that equivalents to styrene are: vinyltoluene, vinyl acetate, N-vinyl-carbazole, arcylonitrile, methyl methacrylate, n-butyl methacrylate, diallyl phthalate, allyl diglycol carbonate.

If it were possible to provide a thixotropic or thickening additive for unsaturated polyester resins, particularly those containing styrene as a cross-linking agent, a valuable contribution to the art would be afforded. Such an advantage, to be of benefit, should be capable of rapid dispersion into the resin syrup and in relatively small quantities be able to impart thereto an increase in viscosity and thixotropy which enables the material to adhere to vertical surfaces without running or dripping. The advantage should not only be capable of rapidly imparting these properties to the unsaturated polyester resin, but it should not precipitate from the resin after it has been added.

THE INVENTION

An unsaturated polyester resin which contains at least 0.3% by weight of silica particles having an ultimate particle size within the range of 4–70 millimicrons, whose particles have their surface coated with a quaternary ammonium salt which contains at least 1 organic radical of at least 6 carbon atoms in chain length.

The Quaternary Ammonium Coated Silica Sols

These organosols are prepared by treating aqueous colloidal silica sols with organic solvent solutions of quaternary ammonium salts whereby the individual particles of the colloidal silica have coated about their surface at least ½ up to 2 molecular layers of the quaternary ammonium salt used. More quaternary ammonium salt can be used but it is not necessary. Such quaternary ammonium coated silica sols are known in the art and are described in U.S. Pat. No. 2,692,863 and U.S. Pat. No. 3,916,058, the disclosures of which are incorporated by reference.

The particle size of the starting silica sol is critical with respect to the success of this invention. Specifically, the ultimate particle size of the silica in the starting sol and which is coated with the quaternary ammonium salt, should be within the range of 4–70 millimicrons and is, preferably, within the range of 8–20 millimicrons. Typical of a silica sol which may be coated with the quaternary ammonium salts is the commercial material, NALCOAG ® 1030, the description of which is set forth below:

| | |
|---|---|
| Colloidal Silica as $SiO_2$ | 30% |
| pH | 10.2 |
| Average Particle Size | 11–16 mμ |
| Average Surface Area | 190–270 $m^2$/gram |
| Specific Gravity (at 68° F.) | 1.208 |
| Viscosity (at 77° F.) | 5 cp |

The Quaternary Ammonium Salts and the Method for Coating the Silica Sols

The quaternary ammonium salts used to place at least ½ mono layer of such salts over the silica particles are characterized as containing at least 1 organic radical which contains at least 6 carbon atoms. Preferably, the quaternary ammonium salts have at least 1 radical of at least 12 carbon atoms in chain length, or 2-3 hydrocarbon radicals of between 8-10 carbon chains. An example of this preferred type quaternary ammonium salt is tricaprylyl methyl ammonium chloride, having the structural formula:

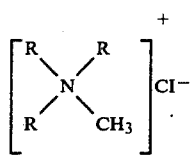

where R is a mixture of $C_8$ and $C_{10}$ carbon chains with $C_8$ predominating.

Examples of other quaternary ammonium salts that may be used in the practice of the invention are those described in U.S. Pat. No. 2,692,863, which has previously been incorporated herein by reference. Also, see the various quaternary ammonium salts described in U.S. Pat. No. 3,916,058. The amount of quaternary ammonium salt used in relation to the silica present in the starting aqueous silica sol may vary from as much as 2:1 to 6:1 with preferred ratios being within the range of 3:1-5:1. The sols are conveniently prepared by adding an organic liquid such as hexane or a cosolvent system such as hexane and styrene which contains dissolved therein the quaternary ammonium salt. This mixture is then added to the aqueous colloidal silica sol. The colloidal silica becomes coated with the quaternary ammonium salt with good stirring after a short period of time and is extracted into the organic solvent. The thus-coated silica sol contained in the organic liquid may be used directly to treat the unsaturated polyester resins. It is contemplated that the organic liquid may be separated from the coated silica, which material may be then directly dispersed into the polyester resin although this represents a non-preferred embodiment of the invention.

Aliphatic Hydrocarbon—Styrene Coated Silica Compositions

The most convenient method for adding the quaternary ammonium salt-coated silica particles to styrene-containing unsaturated polyester resins is to place the coated silica particles into a cosolvent system of hexane and styrene, thereby providing an organic liquid system compatible with the polyester styrene-containing resin.

To prepare such systems, all that is necessary is to utilize as a hydrocarbon liquid such materials as kerosenes, decane, light naphthas and the like which should be predominantly aliphatic in makeup. A preferred aliphatic hydrocarbon liquid is hexane. In any event, the aliphatic hydrocarbon liquid should be soluble or compatible with styrene. A mixture of styrene and hexane containing the coated silica particles is then added to the polyester resin system with good stirring. It is preferred that the ratios of aliphatic hydrocarbon liquid to styrene be at least 0.5:1 but not more than 5:1 to insure a stable system which will not precipitate the coated silica particles. The amount of coated silica in these systems, expressed as $SiO_2$, can range from as little as about 10% by weight up to the saturation solubility of finely divided particles of silica. Most products suitable for commercial use should contain at least 15% by weight $SiO_2$.

The amount of quaternary ammonium salt-coated silica, expressed as $SiO_2$, necessary to impart good thickening and reological properties to the unsaturated polyester resins may be as little as 0.3% with quantities as large as 1% also being useful. In most instances, the quantity of silica in the resin will vary between 0.5-1% by weight. However, some resin systems may require as much as 5% silica by weight in order to achieve the desired properties.

EXAMPLES

Experimental

All organosols were prepared by direct extraction from the aqueous sol. A quaternary ammonium salt previously described was dissolved in the solvents and given sufficient mixing with the NALCOAG to insure complete coating of the silica particle before separation. Percent silica solids were run on the organosols to check for complete extraction. Room and oven stability tests were run on the sols.

Tests performed on the resin systems included:

1. Brookfield viscosity (model LVF) read at 30 seconds, run on #3 at 60 rpm, and #3 at 6 rpm.

2. Thixotropic Index:

"This test gives an indication of the flase body of a resin and indirectly relates to sag or drain resistance. Basically, the viscosity is run using the same Brookfield and spindle at two different speeds (one is 10 times the other) and dividing the slower-speed viscosity by the high-speed viscosity; normal range is from 1.2 to 3."[1]

[1] *Applications Manual for Cook's Polycor Polyester Resins and Gel Coats*, Cook Paint and Varnish Company, No. 2077A, 1978, p. 80.

Results and Discussion

Samples of NALCOAG® 1050 and 1060, coated with a quaternary ammonium salt in hexane only were sent to a resin supplier and found unsatisfactory which led to testing cosolvent systems. It has been shown that the level of hexane in the sol is significant, with best results achieved between 15 and 30% hexane (Tables I and II.) In Tables I and II the silica sols, NALCOAG® 1050 and 1130 have the following compositions:

| NALCOAG®1050 | |
|---|---|
| Colloidal Silica as $SiO_2$ | 50% |
| pH | 9.0 |
| Average Particle Size | 17–25 m$\mu$ |
| Average Surface Area | 120–176 m$^2$/gram |
| Specific Gravity at 68° F. | 1.390 |
| Viscosity | 70 cp (max) |
| $Na_2O$ | 0.4% |

| NALCOAG®1130 | |
|---|---|
| Colloidal Silica as $SiO_2$ | 30% |
| pH | 10.0 |
| Average Particle Size | 8 m$\mu$ |
| Average Surface Area | 375 m$^2$/gram |
| Specific Gravity | 1.214 |
| Viscosity | <10 cps |

The particle size of the silica is also critical, the smaller 1030 particle size (13 m$\mu$) giving much better results than the large particle 1050 (20 m$\mu$) and 1060 (60 m$\mu$) sols in all tests (Tables I, III, IV). Theoretically an even smaller particle such as 1130 (8 mµ) would give even better results, but performance peaked with 1030 (Tables I, III, IV).

NALCOAG ® 1060 in Table III has the following composition:

| | |
|---|---|
| Colloidal Silica as SiO$_2$ | 50% |
| pH | 8.5 |
| Average Particle Size | 50–70 mµ |
| Average Surface Area | 40–60 m$^2$/gram |
| Specific Gravity at 68° F. | 1.390 |
| Viscosity at 77° F. | 15 cp max |

The quat concentration and hexane to quat ratio are also important. As can be seen in Table IV, best results were achieved at similar levels of hexane and quat in the system. Quat level in the sols is dependent upon size of the silica particle being coated, with the optimum level being the minimum amount necessary to effect sharp, complete separation in the extraction. Addition of excess quat did not significantly increase viscosities.

The organosols imparted much better stability to the resin systems than a fine silica powder as described below (Table VI) at both room and oven temperatures.

The fact that the control and silica powder resin systems gelled in a relatively short period while the organosol/resin systems did not, implies that the sol may be stabilizing the resin against early polymerization, via a mechanism unknown at this time. The sol products have shown excellent room stabilities at the hexane levels tested. Polymerization of styrene can cause instability in organosols at 140° F. (Table V). Extra polymerization inhibitors can probably extend shelf life at higher temperatures, if necessary.

The organosols can be quickly and easily mixed into the resin. However, after mixing, one-half to one hour is required to reach maximum viscosity. Equilibrium time could not be meaningfully checked with the fine silica powders because the mixing process creates air bubbles and, therefore, an initially high viscosity.

In all of the above test work, the resin used was a styrene-containing unsaturated polyester laminated resin of the type used to coat fiberglass.

The same resin was used to run sag tests which are described below. Sag time was evaluated on the thickened organosol/resin systems and the unthickened resin. The sag results dramatically illustrate the reduced drainage in the thickened resin (Table VII).

TABLE I
COMPARISON OF COSOLVENTS

| ORGANSOL | | SILICA/RESIN SYSTEM | | | |
|---|---|---|---|---|---|
| SILICA | COSOLVENT | | Viscosity | | THIX |
| SOL | & STYRENE | % SiO$_2$ | 3 @ 6rpm | 3 @ 60rpm | INDEX |
| NONE | — | 0.0 | — | 174.cps | — |
| Silica Powder[1] | — | 0.5 | 700.cps | 420. | 1.7 |
| Silica Powder | — | 0.8 | 820. | 450. | 1.8 |
| Silica Powder | — | 1.0 | 3400. | 1040. | 3.3 |
| 1050 | 10% Hexane | 0.5 | 220. | 248. | 0.89 |
| 1050 | 10% Hexane | 0.8 | 240. | 258. | 0.93 |
| 1050 | 10% Hexane | 1.0 | 260. | 260. | 1.0 |
| 1050 | 10% Decane | 0.5 | 220. | 240. | 0.92 |
| 1050 | 10% Decane | 0.8 | 280. | 250. | 1.12 |
| 1050 | 10% Decane | 1.0 | 280. | 268. | 1.04 |
| 1030 | 5% Hexane | 0.5 | 280. | 260. | 1.08 |
| 1030 | 5% Hexane | 0.8 | 300. | 312. | 0.96 |
| 1030 | 5% Hexane | 1.0 | 340. | 340. | 1.0 |
| 1030 | 10% Hexane | 0.5 | 280. | 272. | 1.03 |
| 1030 | 10% Hexane | 0.8 | 780. | 394. | 1.98 |
| 1030 | 10% Hexane | 1.0 | 860. | 420. | 2.05 |
| 1030 | 15% Hexane | 0.5 | 340. | 322. | 1.1 |
| 1030 | 15% Hexane | 0.8 | 640. | 470. | 1.4 |
| 1030 | 15% Hexane | 1.0 | 1200. | 552. | 2.2 |
| 1030 | 20% Hexane | 0.8 | 800. | 500. | 1.6 |
| 1030 | 25% Hexane | 0.8 | 1180. | 540. | 2.2 |
| 1030 | 30% Hexane | 0.8 | 880. | 520. | 1.7 |
| 1030 | 35% Hexane | 0.8 | 300. | 314. | 0.96 |
| 1030 | 63% Hexane | 0.5 | 240. | 240. | 1.0 |
| 1030 | (no styrene) | 0.8 | 260. | 310. | 0.84 |
| 1030 | (no styrne) | 1.0 | 300. | 368. | 0.82 |
| 1030 | 5% Decane | 0.5 | 300. | 322. | 0.93 |
| 1030 | 5% Decane | 0.8 | 700. | 456. | 1.5 |
| 1030 | 5% Decane | 1.0 | 1240. | 580. | 1.6 |
| 1030 | 10% Decane | 0.5 | 240. | 268. | 0.89 |
| 1030 | 10% Decane | 0.8 | 400. | 330. | 1.21 |
| 1030 | 10% Decane | 1.0 | 1000. | 440. | 2.27 |
| 1130 | 10% Hexane | 0.5 | 280. | 276. | 1.01 |
| 1130 | 10% Hexane | 0.8 | 280. | 284. | 0.99 |
| 1130 | 10% Hexane | 1.0 | 320. | 316. | 1.01 |
| 1130 | 10% Decane | 0.5 | 240. | 268. | 0.9 |
| 1130 | 10% Decane | 0.8 | 280. | 310. | 0.9 |
| 1130 | 10% Decane | 1.0 | 340. | 370. | 0.92 |

[1]Properties of Silica Powders:
Percent Silica as SiO$_2$ — 99.8%
Trace Metals — 0.2%
Surface Area — 200 m$^2$/gm.
pH Value (Aqueous) — 4

TABLE II

EFFECT OF HEXANE CONCENTRATION

| ORGANOSOL | | | SILICA/RESIN SYSTEM | | | |
|---|---|---|---|---|---|---|
| | SILICA | COSOLVENT | | Viscosity | | THIX |
| % SiO$_2$ | SOL | & STYRENE | % SiO$_2$ | 3 @ 6rpm | 3 @ 60rpm | INDEX |
| None - Control | — | — | 0.0 | — | 174cps. | — |
| 100% | Silica Powder | — | 0.5 | 700.cps | 420. | 1.7 |
| 100% | Silica Powder | — | 0.8 | 820. | 450. | 1.8 |
| 100% | Silica Powder | — | 1.0 | 3400. | 1040. | 3.3 |
| 30% | 1030 | 5% Hexane | 0.5 | 280. | 260. | 1.08 |
| 30% | 1030 | 5% Hexane | 0.8 | 300. | 312. | 0.96 |
| 30% | 1030 | 5% Hexane | 1.0 | 340. | 340. | 1.0 |
| 30% | 1030 | 10% Hexane | 0.5 | 280. | 272. | 1.03 |
| 30% | 1030 | 10% Hexene | 0.8 | 780. | 394. | 1.98 |
| 30% | 1030 | 10% Hexane | 1.0 | 860. | 420. | 2.05 |
| 30% | 1030 | 15% Hexane | 0.5 | 340. | 322. | 1.1 |
| 30% | 1030 | 15% Hexane | 0.8 | 640. | 470. | 1.4 |
| 30% | 1030 | 15% Hexane | 1.0 | 1200. | 522. | 2.2 |
| 30% | 1030 | 20% Hexane | 0.8 | 800. | 500. | 1.6 |
| 30% | 1030 | 25% Hexane | 0.5 | 480. | 320. | 1.5 |
| 30% | 1030 | 25% Hexane | 0.6 | 640. | 360. | 1.8 |
| 30% | 1030 | 25% Hexane | 0.7 | 800. | 410. | 1.95 |
| 30% | 1030 | 25% Hexane | 0.8 | 1180. | 540. | 2.2 |
| 30% | 1030 | 30% Hexane | 0.8 | 880. | 520. | 1.7 |
| 30% | 1030 | 35% Hexane | 0.8 | 300. | 314. | 0.96 |
| 30% | 1030 | 63% Hexane | 0.5 | 240. | 240. | 1.0 |
| 30% | 1030 | (no styrene) | 0.8 | 260. | 310. | 0.84 |
| 30% | 1030 | (no styrene) | 1.0 | 300. | 368. | 0.82 |
| 40% | 1030 | 15% Hexane | 0.8 | 340. | 378. | 0.9 |
| 40% | 1030 | 25% Hexane | 0.8 | 1180. | 496. | 2.4 |
| 40% | 1030 | 30% Hexane | 0.4 | 260. | 260. | 1.0 |
| 40% | 1030 | 30% Hexane | 0.5 | 480. | 330. | 1.45 |
| 40% | 1030 | 30% Hexane | 0.6 | 800. | 400. | 2.0 |
| 40% | 1030 | 30% Hexane | 0.7 | 900. | 440. | 2.05 |
| 40% | 1030 | 30% Hexane | 0.8 | 1500. | 500. | 3.0 |

TABLE III

COMPONENT CONCENTRATION IN RESIN SYSTEMS

| ORGANOSOL | | | SILICA/RESIN SYSTEM | | | | |
|---|---|---|---|---|---|---|---|
| % SiO$_2$ | SILICA SOL | COSOLVENT & STYRENE | % SiO$_2$ | % QUAT | % HEXANE | % STYRENE | VISCOSITY 3 @ 60rpm |
| 29.6 | 1050 | 10% Hexane | 0.5 | 0.08 | 0.17 | 6.02 | 248.cps |
| 29.6 | 1050 | 10% Hexane | 0.8 | 0.13 | 0.27 | 5.57 | 258. |
| 29.6 | 1050 | 10% Hexane | 1.0 | 0.16 | 0.34 | 5.27 | 260. |
| 29.5 | 1030 | 5% Hexane | 0.5 | 0.12 | 0.08 | 6.07 | 260. |
| 29.5 | 1030 | 5% Hexane | 0.8 | 0.20 | 0.14 | 5.63 | 312. |
| 29.5 | 1030 | 5% Hexane | 1.0 | 0.24 | 0.16 | 5.35 | 340. |
| 30.5 | 1030 | 10% Hexane | 0.5 | 0.12 | 0.16 | 6.01 | 272. |
| 30.5 | 1030 | 10% Hexane | 0.8 | 0.19 | 0.26 | 5.55 | 394. |
| 30.5 | 1030 | 10% Hexane | 1.0 | 0.24 | 0.33 | 5.23 | 420. |
| 30.0 | 1030 | 15% Hexane | 0.5 | 0.12 | 0.25 | 5.9 | 322. |
| 30.0 | 1030 | 15% Hexane | 0.8 | 0.19 | 0.40 | 5.37 | 470. |
| 30.0 | 1030 | 15% Hexane | 1.0 | 0.24 | 0.50 | 4.99 | 552. |
| 31.0 | 1030 | 20% Hexane | 0.8 | 0.19 | 0.49 | 5.3 | 500. |
| 30.0 | 1030 | 25% Hexane | 0.5 | 0.12 | 0.42 | 8.21 | 320. |
| 30.0 | 1030 | 25% Hexane | 0.6 | 0.14 | 0.50 | 8.0 | 360. |
| 30.8 | 1030 | 25% Hexane | 0.7 | 0.17 | 0.58 | 7.79 | 410. |
| 30.0 | 1030 | 25% Hexane | 0.8 | 0.19 | 0.65 | 5.16 | 540. |
| 32.0 | 1030 | 30% Hexane | 0.8 | 0.18 | 0.75 | 5.1 | 520. |
| 30.5 | 1030 | 35% Hexane | 0.8 | 0.19 | 0.92 | 4.89 | 314. |
| 32.9 | 1030 | 62.8% Hexane | 0.5 | 0.11 | 0.95 | 5.26 | 240. |
| 32.9 | 1030 | (no styrene) | 0.8 | 0.17 | 1.53 | 4.35 | 310. |
| 32.9 | 1030 | (no styrene) | 1.0 | 0.22 | 1.91 | 3.74 | 368. |
| 30.4 | 1130 | 10% Hexane | 0.5 | 0.19 | 0.16 | 5.94 | 276. |
| 30.4 | 1130 | 10% Hexane | 0.8 | 0.31 | 0.26 | 5.42 | 284. |
| 30.4 | 1130 | 10% Hexane | 1.0 | 0.38 | 0.33 | 5.08 | 316. |
| 49.3 | 1060 | 22.5% Hexane | 0.8 | 0.12 | 0.37 | 7.95 | 200. |
| 37.3 | 1030 | 15% Hexane | 0.8 | 0.21 | 0.32 | 5.4 | 378. |
| 38.8 | 1030 | 25% Hexane | 0.8 | 0.20 | 0.52 | 7.7 | 496. |
| 39.6 | 1030 | 30% Hexane | 0.8 | 0.19 | 0.61 | 7.63 | 500. |

TABLE IV
COMPONENT CONCENTRATIONS OF BEST ORGANOSOLS IN RESIN SYSTEMS

| %SiO$_2$ | SILICA SOL | COSOLVENT & STYRENE | %SiO$_2$ | %HEXANE | %QUAT | HEXANE/QUAT | VISCOSITY 3 @ 60rpm |
|---|---|---|---|---|---|---|---|
| 30% | 1030 | 15% Hexane | 0.8 | 0.40 | 0.19 | 2.1 | 470.cps. |
| 30% | 1030 | 15% Hexane | 1.0 | 0.50 | 0.24 | 2.1 | 552. |
| 30% | 1030 | 20% Hexane | 0.8 | 0.49 | 0.19 | 2.6 | 500. |
| 30% | 1030 | 25% Hexane | 0.8 | 0.65 | 0.19 | 3.4 | 540. |
| 30% | 1030 | 25% Hexane | 0.8 | 0.67 | 0.19 | 3.5 | 520. |
| 30% | 1030 | 30% Hexane | 0.8 | 0.75 | 0.18 | 4.2 | 520 |
| 40% | 1030 | 25% Hexane | 0.8 | 0.52 | 0.20 | 2.6 | 496 |
| 40% | 1030 | 30% Hexane | 0.8 | 0.61 | 0.19 | 3.2 | 500. |

TABLE V
STABILITIES OF ORGANOSOLS

| ORGANOSOL | ROOM STABILITY | OVEN (140° F.) STABILITY |
|---|---|---|
| 30% 1030–10% Hexane | still stable @ 40 days | Styrene polymerized |
| 30% 1030–15% Hexane | still stable @ 40 days | Styrene polymerized. |
| 30% 1030–20% Hexane | still stable @ 40 days | Styrene polymerized. |
| 30% 1030–25% Hexane | still stable @ 40 days | Styrene polymerized. |
| 30% 1030–30% Hexane | still stable @ 40 days | |
| 30% 1030–35% Hexane | still stable @ 40 days | still stable @ 40 days |
| 30% 1030–63% Hexane (no Styrene) | still stable @ 40 days | still stable @ 40 days |
| 40% 1030–15% Hexane | still stable @ 20 days | Styrene polymerized. |

TABLE VI
STABILITIES OF SILICA/RESIN SYSTEMS

| ORGANOSOLS | % SiO$_2$ IN RESIN | ROOM STABILITY | OVEN (140°) STABILITY |
|---|---|---|---|
| Control | 0.0% | — | gels < 10 days |
| Silica Powder | 0.8% | settles @4–6 days | settles @2–4 days, gels @–8 days |
| 50% 1060–22.5% Hexane | 0.8% | settles @1 day | settles @1 day |
| 30% 1050–10% Hexane | 0.8% | settles @8 days | settles @4 days |
| 30% 1050–10% Decane | 0.8% | settles @6 days | settles @3 days |
| 30% 1030–10% Hexane | 0.8% | settles @10 days | settles @8 days |
| 30% 1030–10% Decane | 0.8% | settles @10 days | settles @7 days |
| 30% 1030–25% Hexane | 0.8% | no settling @20 days* | settles @10 days |
| 40% 1030–25% Hexane | 0.8% | no settling @20 days* | settles @10 days |
| 40% 1030–30% Hexane | 0.8% | no settling @10 days* | — |
| 30% 1130–10% Hexane | 0.8% | settles @15 days | settles @7 days |
| 30% 1130–10% Decane | 0.8% | settles @15 days | settles @ 7 days |

*tests continuing.

TABLE VII

| Organosols | % SiO$_2$ in Resin | Sag Test Results* Sag Time (> 2 hrs. acceptable) |
|---|---|---|
| Control | 0.0 | 20 min. |
| 30% 1030–15% Hexane | 0.8 | no visible drain at 24 hrs. |
| 30% 1030–20% Hexane | 0.8 | no visible drain at 24 hrs. |
| 30% 1030–25% Hexane | 0.6 | good at 7 hrs., drain at 24 hrs. |
| 30% 1030–25% Hexane | 0.8 | no visible drain at 24 hrs. |
| 40% 1030–25% Hexane | 0.6 | good at 6 hrs., drain at 24 hrs. |
| 40% 1030–25% Hexane | 0.8 | no visible drain at 24 hrs. |

*Sag Test — Composition:
25%–1.5 oz. Fiberglass Mat
75% Thickened Polyester Resin
Procedure
1. Place Fiberglass/Resin Test Sample over metal plate bent at 45° angle.
2. Observe and record time when white spots 1-½-2 mm. long appear on the crown of the Fiberglass.

I claim:

1. An unsaturated polyester resin which contains at least 0.3% by weight of silica particles having an ultimate particle size within the range of 4–70 millimicrons, which particles have their surface coated with a quaternary ammonium salt which contains at least 1 organic radical of at least 6 carbon atoms in chain length.

2. The unsaturated polyester resin of claim 1 where the silica particles have an ultimate particle-size within the range of 8–20 millimicrons.

3. The unsaturated polyester of claim 2 where the quaternary ammonium salt has the following structural formula:

$$\begin{bmatrix} R & \diagdown & \diagup & R \\ & N & \\ R & \diagup & \diagdown & CH_3 \end{bmatrix}^+ Cl^-$$

where R is a mixture of C$_8$ and C$_{10}$ carbon chains with C$_8$ predominating.

4. A composition comprising an aliphatic hydrocarbon liquid and styrene in a weight ratio of aliphatic hydrocarbon liquid to styrene of at least 0.5:1 and from 10% by weight up to the saturation solubility of finely divided particles of silica having an average particle size of between 4–70 millimicrons with the surface of said silica particles being coated with a quaternary ammonium salt which contains at least 1 organic radical of at least 6 carbon atoms in chain length.

5. The composition of claim 4 where the finely divided particles of silica have an average particle size between 8–20 millimicrons.

* * * * *